April 26, 1966 G. E. PERKINS ETAL 3,247,770
ROAD MAKING
Original Filed Oct. 22, 1957 9 Sheets-Sheet 6
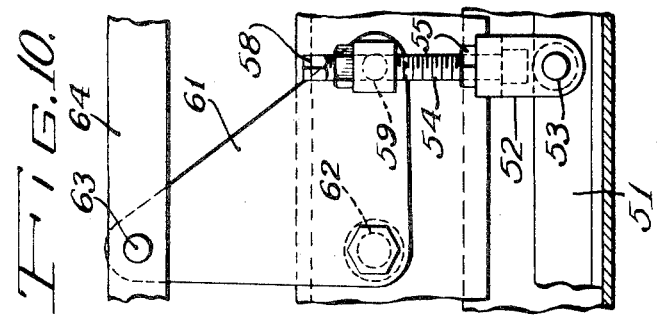
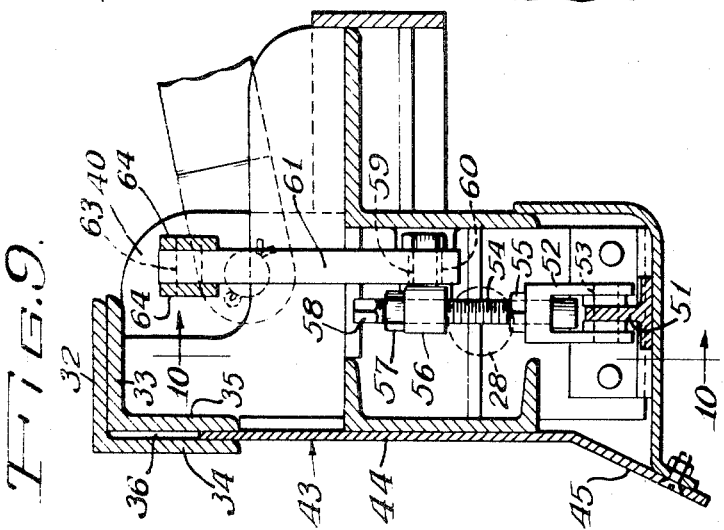
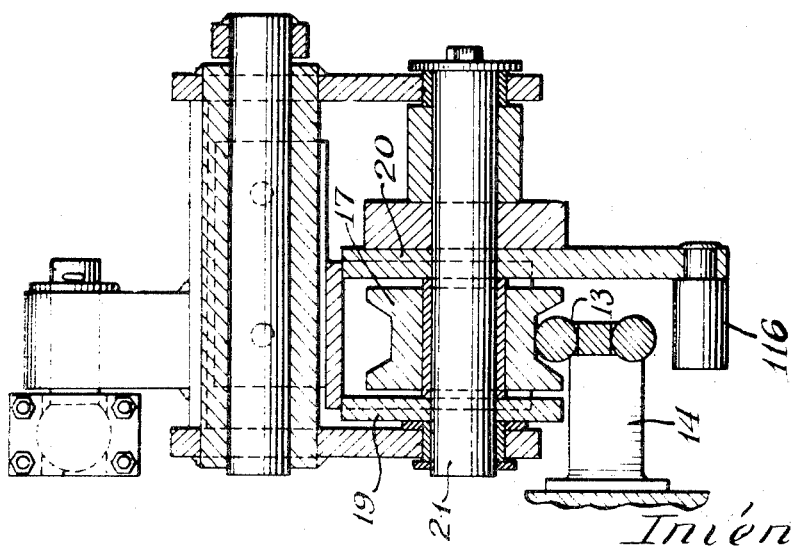
Inventors:
Glen F. Perkins
George W. Dale
By Gary, Desmond & Parker
Atty.

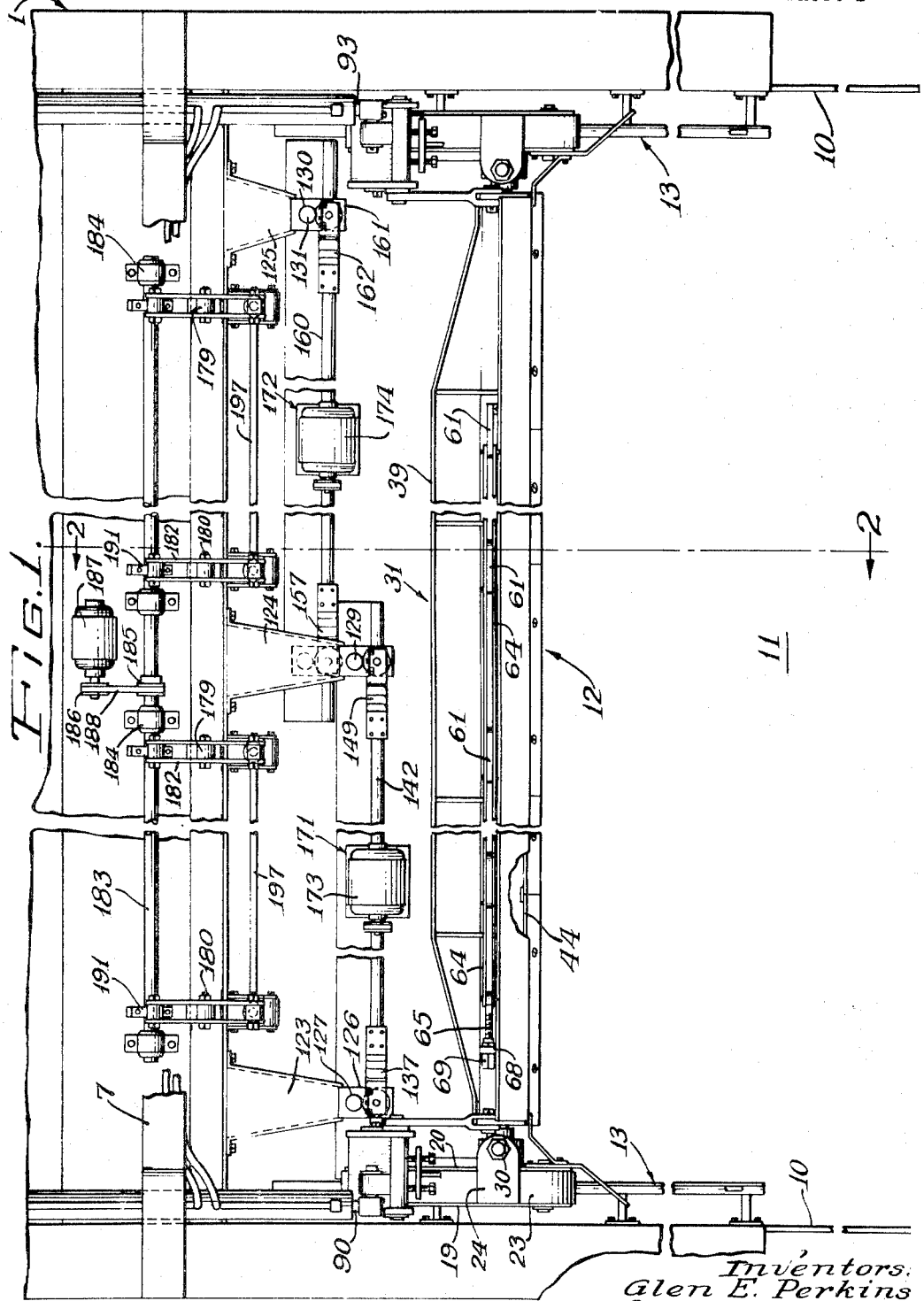

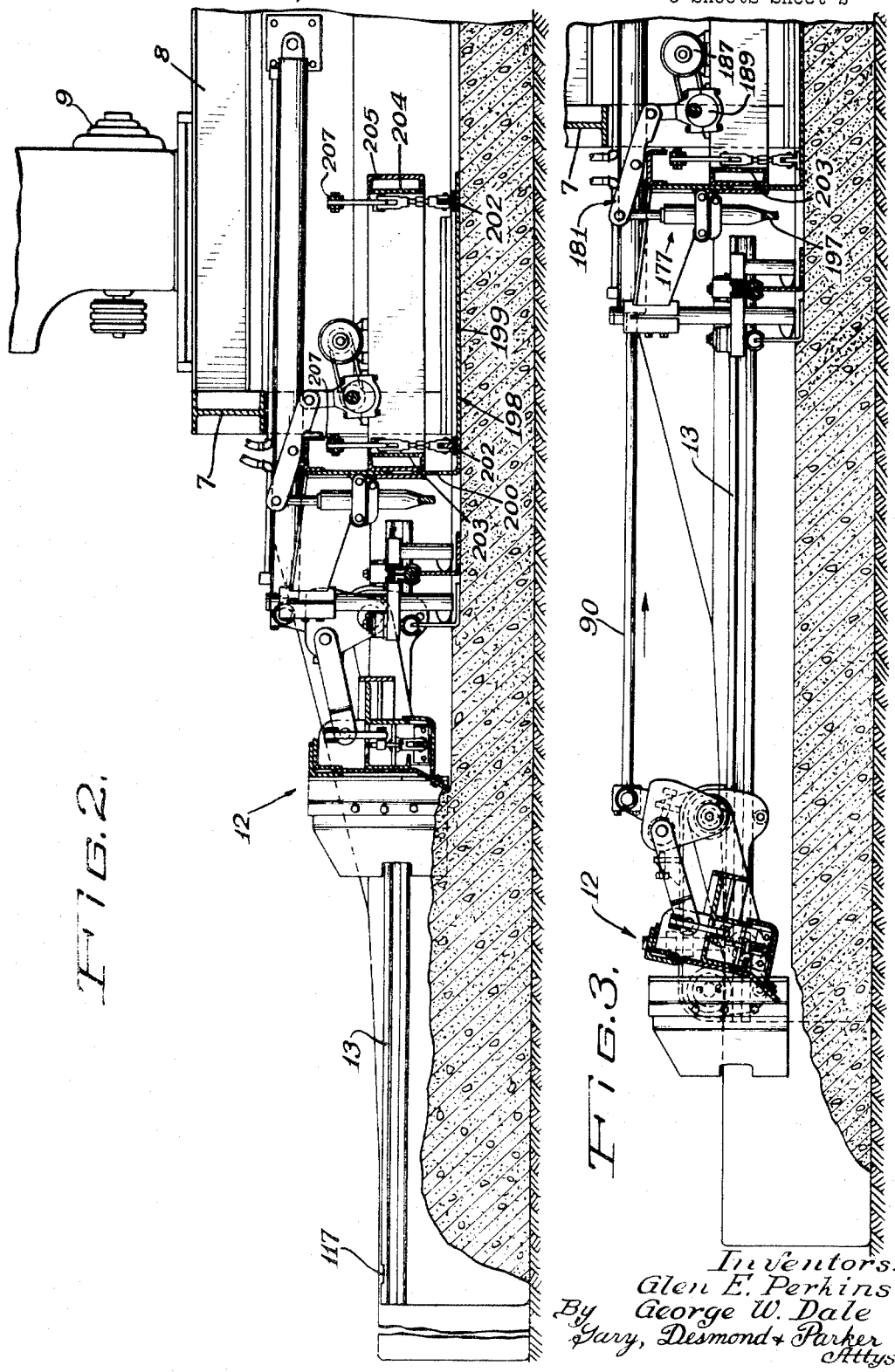

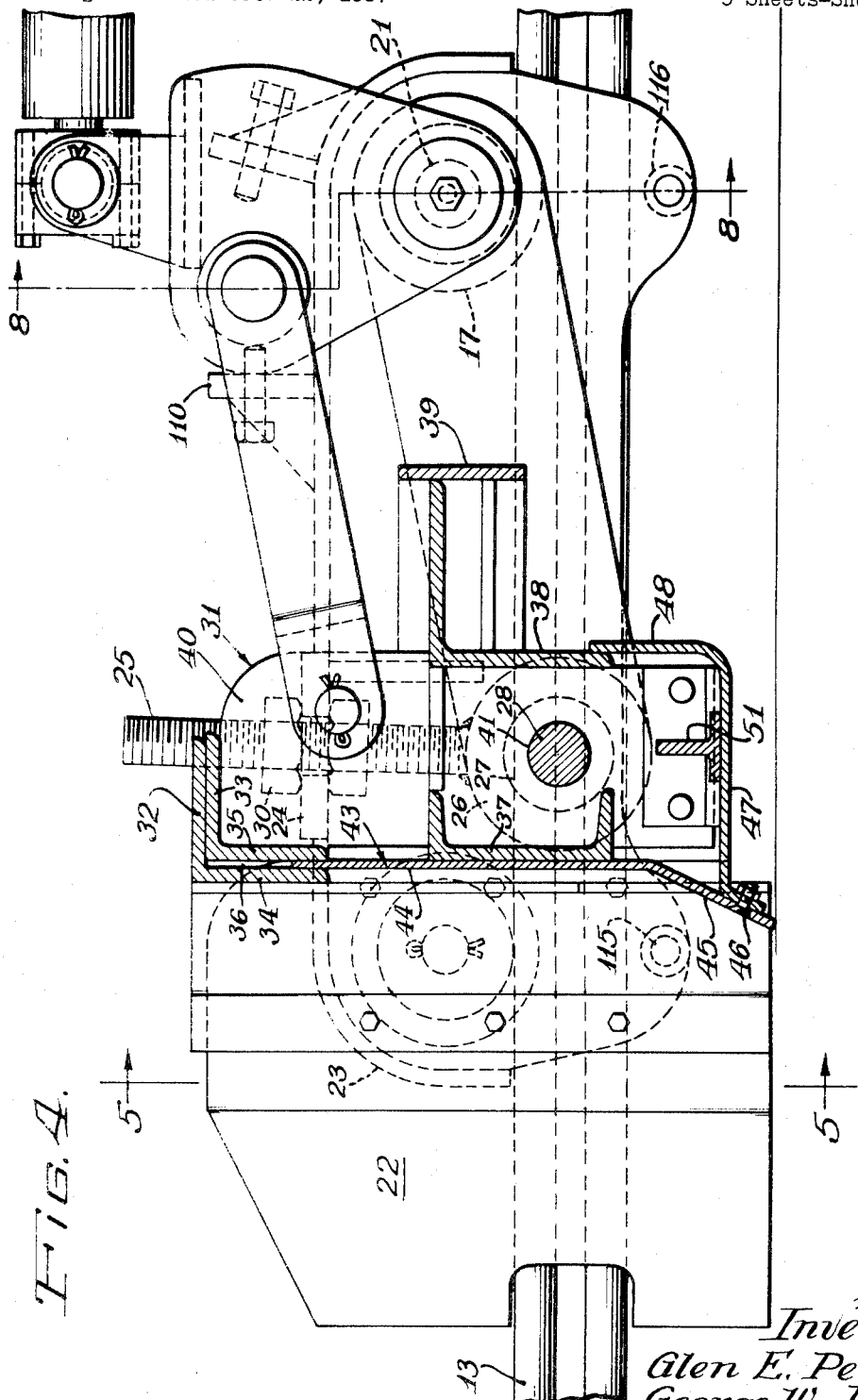

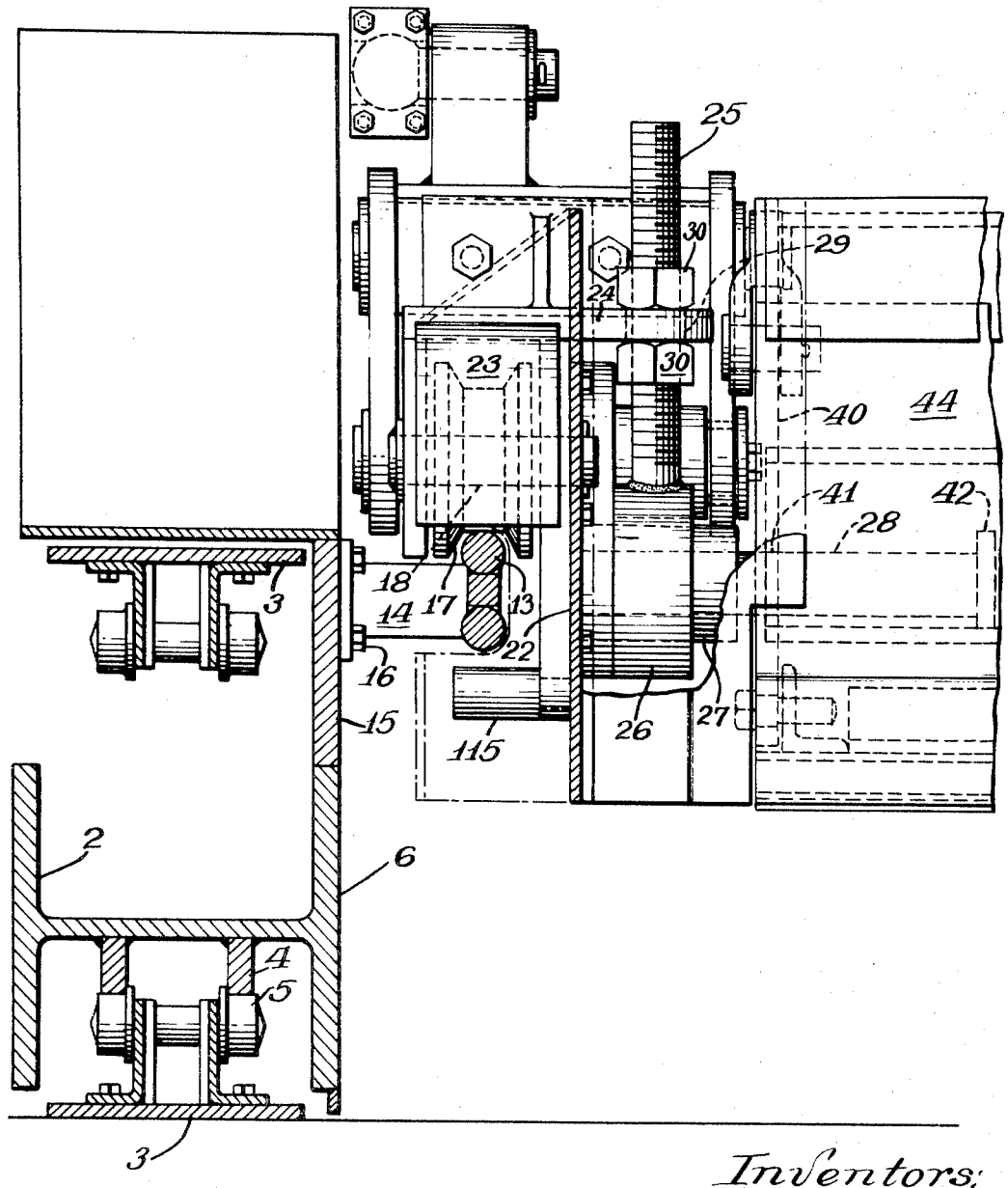

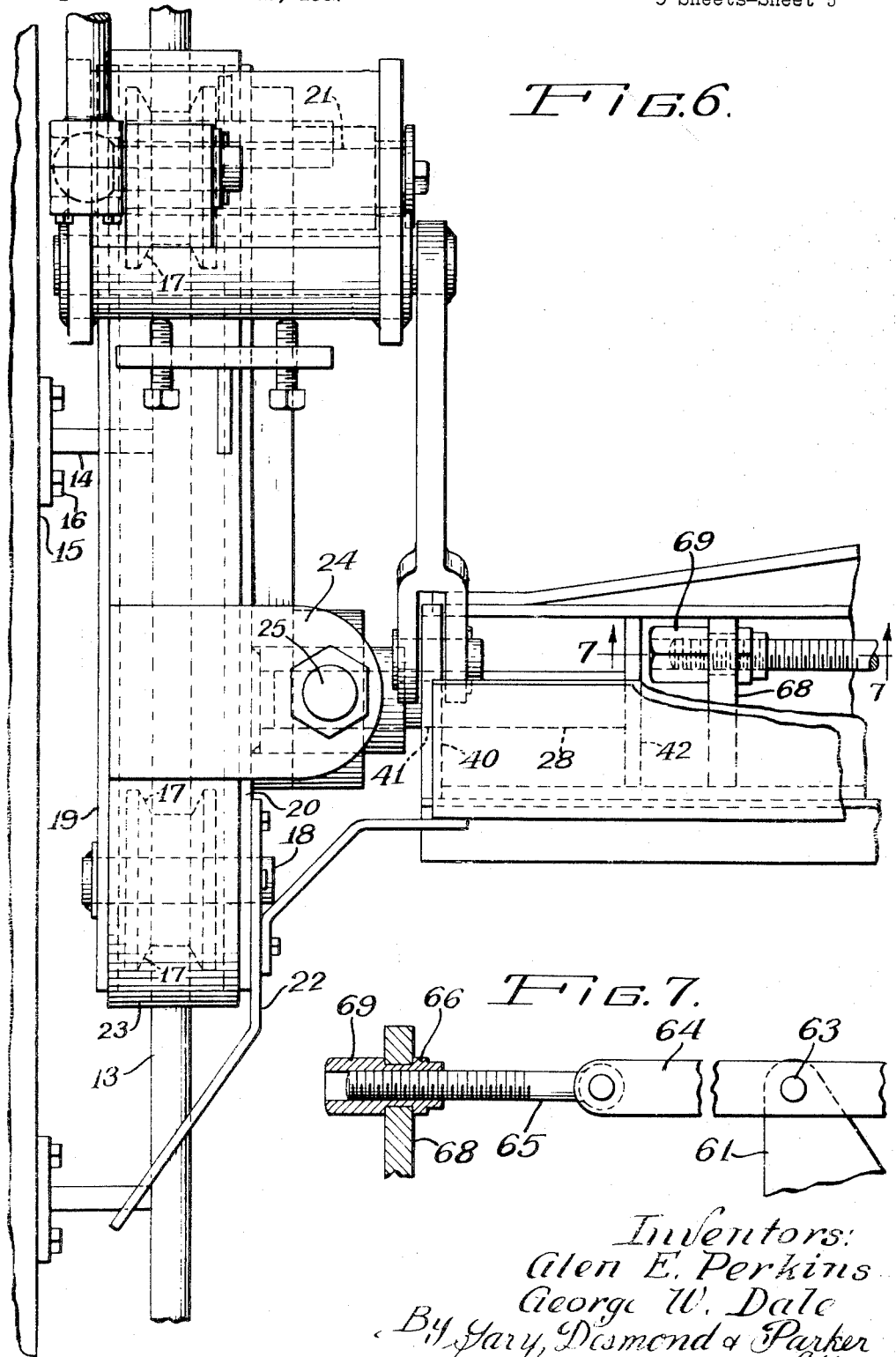

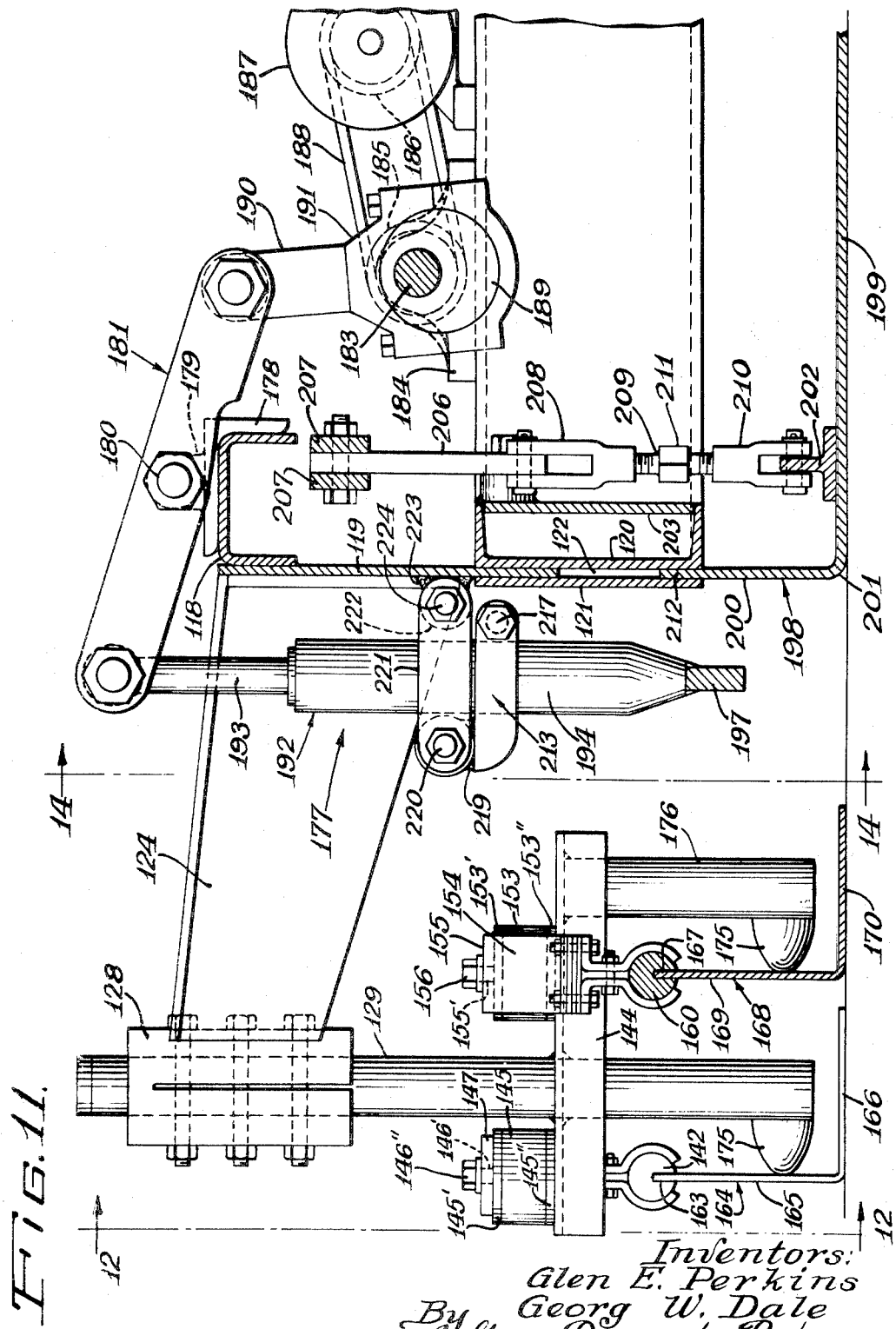

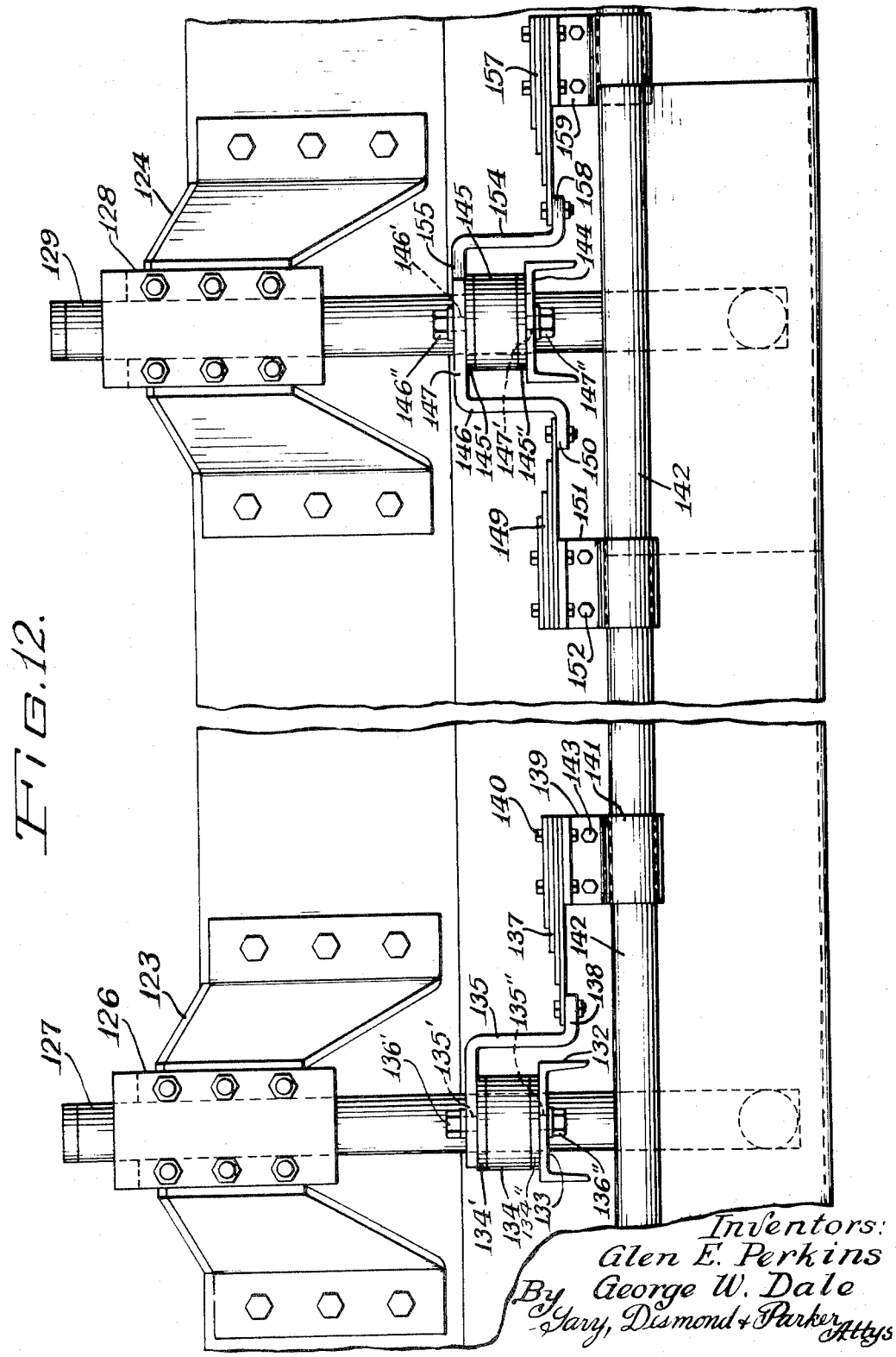

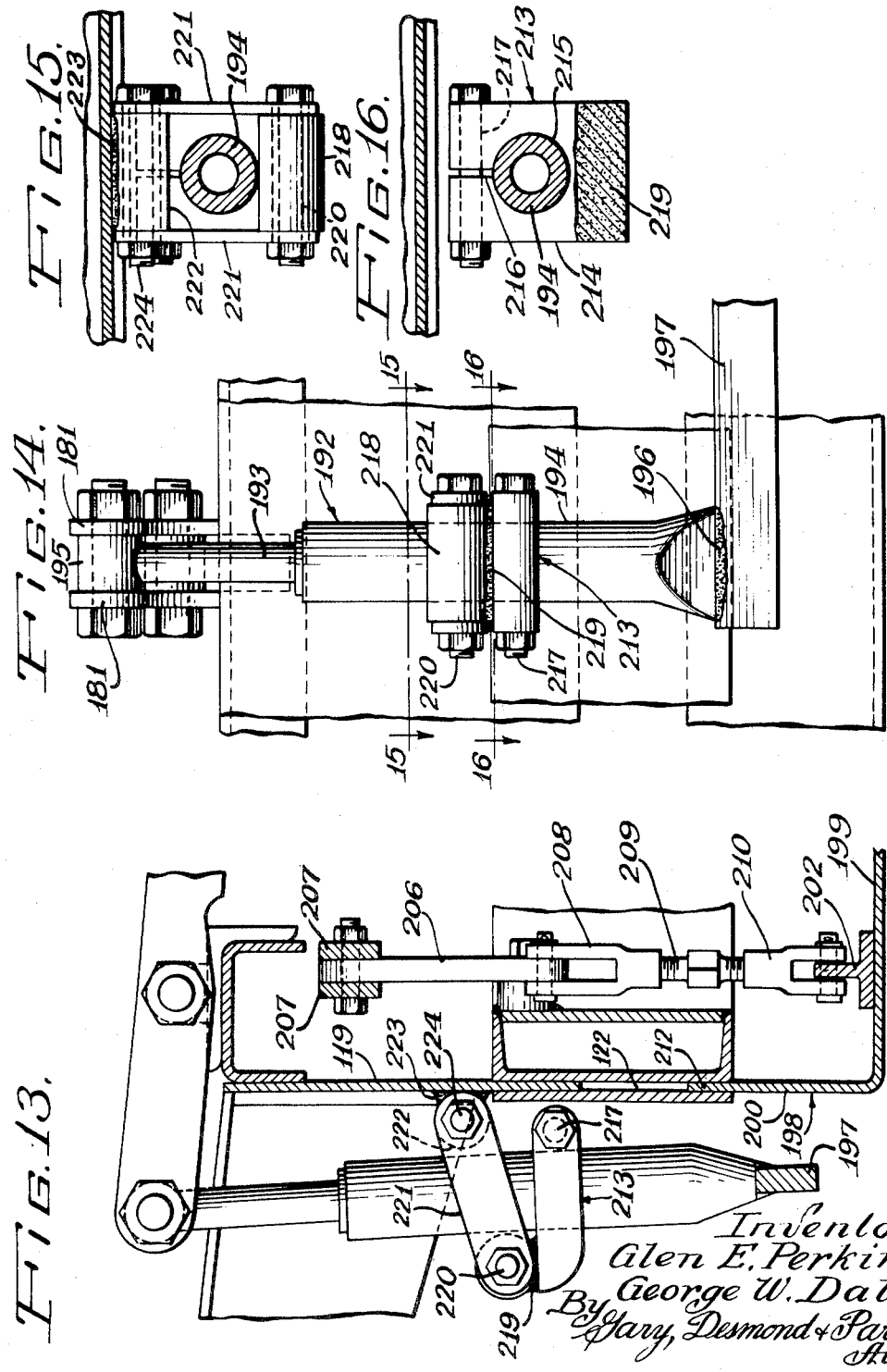

United States Patent Office 3,247,770
Patented Apr. 26, 1966

3,247,770
ROAD MAKING
Glen E. Perkins, 1428 40th Ave., and George W. Dale, 1919 6th St., both of Rock Island, Ill.
Original application Oct. 22, 1957, Ser. No. 691,729, now Patent No. 2,976,784, dated Mar. 28, 1961. Divided and this application Dec. 14, 1960, Ser. No. 75,847
2 Claims. (Cl. 94—45)

This application is a division of our co-pending application, Serial No. 691,729, filed October 22, 1957, now Patent No. 2,976,784.

This invention relates to improvements in roadmaking and refers particularly to a concrete roadmaking machine of the slip-form type, i.e., the type which carries its own forms.

The primary features of the present invention are the provision of a new and vastly improved method of slip-forming concrete slabs, especially pavement slabs, and a new and improved machine facilitating commercial practice of the method.

One of the important features of the machine of the invention resides in a new combination in a specific sequence of a plurality of concrete working and finishing instrumentalities; the instrumentalities being carried by the machine in transversely extending relation to the slip-forms thereof and comprising, in sequence, a primary strike-off for leveling the concrete between the slip-forms to the approximate dimensions of the pavement, vibratory mechanism behind the strike-off for vibrating and densifying the struck-off concrete, and compressive smoothing mechanism behind the vibratory mechanism for further densifying the concrete and extruding it to the finished dimensions of the pavement.

It is, specifically, the object of this invention to provide a slip form concrete paving machine for movement over a subgraded road site for laying thereon in a single pass of the machine a finished concrete roadway, said machine comprising, in combination, a rigid frame structure of substantial mass including spaced parallel coextensive rigid slip forms of substantial length at the sides thereof for laterally confining and molding the side edges of concrete deposited between the forward end portions thereof, a strike-off between said slip forms adjacent the forward ends thereof and extending from one form to the other for spreading the concrete between said forms and striking i'' off to a predetermined shape, means mounting said strike off on said frame structure for independent vertical adjustment for controlling the amount of concrete struck-off during operation of the machine, vibrating means mounted on said frame structure between said slip forms rearwardly of said strike-off and operatively extending from one form to the other for vibrating and densifying the struck-off body of concrete, a pressure plate between said slip forms rearwardly of said vibrating means and extending from one form to the other, said plate including a generally horizontal portion of substantial dimension longitudinally of the machine and an upright portion extending upwardly from the forward edge of said horizontal portion, and means mounting said plate on said frame structure for transferring the mass of the machine to said plate, the mounting means for said plate including means accommodating independent vertical adjustment of each of the forward and rearward edges of the horizontal portion of said plate for causing the same to compressively extrude the body of concrete by the mass of the machine and mold the concrete to the finished dimensions of the roadway.

Other objects, advantages and features of the invention will be apparent from the accompanying drawings and following detailed description.

In the drawings,

FIGURE 1 is a top plan view of the forward portion of a roadmaking machine embodying the features of the present invention.

FIGURE 2 is a longitudinal sectional view of the portion of the machine shown in FIGURE 1, the view being taken on line 2—2 of FIGURE 1 and showing the strike-off in its forwardly moving direction.

FIGURE 3 is a view similar to FIGURE 2 illustrating the strike-off in its rearwardly moving direction.

FIGURE 4 is an enlarged elevational view of the strike-off showing the strike-off head in section.

FIGURE 5 is a sectional view taken on line 5—5 of FIGURE 4.

FIGURE 6 is a top plan view of the portion of the machine shown in FIGURE 5.

FIGURE 7 is a detailed sectional view taken on line 7—7 of FIGURE 6.

FIGURE 8 is a detailed sectional view taken on line 8—8 of FIGURE 4.

FIGURE 9 is an enlarged sectional view through the strike-off head, illustrating particularly the adjusting means for the strike-off blade.

FIGURE 10 is a detailed sectional view taken on line 10—10 of FIGURE 9.

FIGURE 11 is an enlarged sectional view of a portion of the machine shown in FIGURE 2.

FIGURE 12 is an elevational view looking in the direction of the arrows in FIGURE 11.

FIGURE 13 is a detailed sectional view showing a portion of the machine illustrated in FIGURE 11, showing the tamper in a different position than that shown in FIGURE 11.

FIGURE 14 is a sectional view taken on line 14—14 of FIGURE 11.

FIGURE 15 is a detailed sectional view taken on line 15—15 of FIGURE 14.

FIGURE 16 is a detailed sectional view taken on line 16—16 of FIGURE 14.

Referring in detail to the drawings, 1 indicates generally a road machine embodying the features of the present invention. The machine 1 is basically of the type which carries its own forms, commonly referred to as slip forms. In general the machine proper comprises opposite H-beams 2 (FIGURE 5) which carry and ride upon an articulated track comprising treads 3 which move in an endless path and upon which the H-beams ride, each of the H-beams carrying rails 4 which rest upon rollers 5 carried by the threads 3. The inner or facing sides 6 of the opposite H-beams comprise the forms which are adapted to define the opposite lateral edges of the road as the machine moves along the length of the subgraded road site.

The opposite forms support and are tied together by transverse beams 7 which, together with beams 8 support a generator 9 which supplies electric power for the various motors employed on the machine, such, for instance, as the motors (not shown) which drive the tracks comprising the treads 3.

The beams 2 are elongated relative to the main frame of the machine for purposes of bridging short undulations in the path of travel, and at the forward end of the machine said beams carry advance plates 10 which are in substantial planar alignment with form surfaces 6 of the beams. Thus, the forward portion of the beams 2 together with the advance plates 10 define a space 11 in which the road material is dumped and preliminarily spread, said road material being laterally confined by the beams and advance plates. The road material deposited in the space 11 is acted upon by a spreading mechanism indicated generally at 12 in FIGURES 1, 2 and 3, which is the first step contemplated in the operation of the machine.

A rail 13 is carried by spaced brackets 14 which are, in turn, mounted upon a vertical extension 15 (FIGURE 5) of the inner flange 6 of each beam, the brackets being secured by screws 16. The rails are spaced inwardly from the walls 15 and are disposed parallel to the beams 2. The rails 13 are adapted to guide and support flanged rollers 17 which, in turn, support the spreader 12, as will be hereinafter more fully described. The bearing portion of each rail is rounded to prevent binding of the rollers 17 thereon, the inner faces of the roller flanges being tapered for the same purpose.

There are two rollers 17 mounted upon each side of the spreading mechanism 12, the forward roller on each side being carried by a shaft 18 which is journaled in suitable bearings carried by opposite frame members 19 and 20 and the rear rollers 17 on each side are carried by corresponding shafts 21 also journaled in bearings carried by the rear portions of the opposite frame members 19 and 20. Thus, the frame members 19 and 20 on each side of the machine are adapted for movement forwardly and backwardly upon the opposite rails 13.

A bent plate or shroud 22 is secured to each frame 20 at the forward end portion thereof, said shroud being bent outwardly to protect the forward rollers from loose road material and other debris during the movement of the spreader. A hood 23 extends over each of the forward rollers 17 for the same purpose.

A plate 24 is carried by frame members 19 and 20 immediately behind each of the forward rollers 17 on each side of the machine and each plate carries the threaded shank of an adjusting screw 25. A collar 26 is secured to the lower end of each screw 25 and a tubular sleeve 27 is journaled in each collar. A rod 28 is journaled in each sleeve 27 and extends inwardly of the machine. The shank of screw 25 is loosely positioned in an aperture 29 provided in each plate 24 and nuts 30 are threadedly engaged with the screw threads of the screw, whereby, by the manipulation of nuts 30, the rods 28 may be raised and lowered and may be locked in a desired position.

The rods 28 which are pivotally carried in opposite sleeves 27 are mounted upon opposite ends of a frame 31 and, hence, said frame is rockably mounted about said rods and sleeves. The frame 31 is built up of structural members comprising an upper pair of angles 32 and 33 which are in substantially nested relationship to each other except that leg 34 of angle member 32 is spaced from leg 35 of angle member 33 to provide a slot 36. The frame 31 also comprises a channel member 37 and a plurality of angle members 38 secured to a reinforcing bar 39. The frame 31 also includes opposite end plates 40, each of which is provided with an aperture 41 through which the rod 28 extends. Each rod 28 at its end abuts a lug 42 carried by channel 37. Hence, the frame 31 may be raised and lowered by screws 25 and may be locked in a desired raised or lowered position by nuts 30.

A strike-off blade structure 43 is mounted upon frame 31 and is relatively movable with respect to said frame. The blade structure 43 comprises a plurality of end-abutting plate members 44 which adjacent their lower edges are inclined forwardly, as at 45. The inclined portions 45 are secured, by means of bolts 46 or the like, to a base member 47 which extends rearwardly from the plate in a substantially horizontal direction and at its rear edge carries an upwardly extending integral flange 48. The strike-off blade structure is movable vertically relative to frame 31 and during such movement flange 48 is slidably movable over legs of the angles 38 by which it is guided. The upper edge portion of plate 44 is slidably movable in the space 36 between the legs 34 and 35 of angles 32 and 33 and, hence, the upper portion of the strike-off blade structure is guided in its vertical movement.

A continuous T-iron is secured to the upper or inner face of the base member 47 and is substantially coextensive in length with the length of said base member. At spaced intervals along the length of the base 47 clevises 52 engage the T-iron 51 and are pivotally secured thereto by pins 53. A screw shank 54 extends through each clevis 52 and is secured thereto by nuts 55. The threaded shank of each screw 54 carries an internally threaded follower sleeve 56 which threadedly engages said shank and a lock nut 57 locks the sleeve in desired position. The upper end of shank 54 has a square head 58 whereby, when lock nuts 57 and 55 are loosened, the sleeve may be moved to a desired position along the length of the shank.

A pin 59 extends transversely to the axis of sleeve 56 and is pivotally positioned in an aperture 60 provided in one corner portion of a triangular segment 61. The segment is pivotally mounted adjacent another corner thereof upon a bolt 62 which comprises a pivot for swingable movement of the segment thereabout. The remaining corner portion of each segment is pivotally secured by means of pivot pin 63 between two parallel adjusting bars 64 which extend transversely of the machine and parallel to the strike-off blade structure 43. At one end said bars are pivotally secured to a threaded link 65 which is threadedly engaged with a tubular anchor nut 66 rotatably but non-axially movable in a rib 68 comprising a portion of the frame 31. The protruding head 69 of the anchor nut 67 is of square section whereby said nut may be rotated by means of a suitable wrench axially to move the threaded link 65.

The arrangement is such that by the manipulation of nuts 30 the strike-off blade structure 43 may be moved to a desired vertical position with respect to the frame 31. In addition, by the manipulation of the anchor link 65, bars 64 may be moved longitudinally to rock segments 61. When the segments 61 are rocked, the base plate 47 may be warped to impart a desired convexity thereto to adapt the strike-off to produce a crown in the struck-off road material. Of course, the base plate 47 may be warped for other reasons. The control of the warped contour of the base plate 47 is also exercised by the manipulation of screws 54. In effect the manipulation of screws 54 determines the nature of the warp imparted to the base 47 and the anchor screw controls the degree of warping of the plate.

The important features of the primary strike-off for purposes of the present invention are (1) its function to spread concrete dumped ahead of it and to strike the concrete off to a selected level, (2) the vertical adjustability of the strike-off blade to control the level at which the concrete is struck off during forward travel of the machine, and (3) the adjustable warping of the blade to shape the body of concrete to the specified configuration for each portion or profile of the roadway as it is being laid. The remaining details of the primary strike-off may be determined from our said parent application, now Patent 2,976,784.

For the present, it will suffice to state that the strike-off, in its preferred form as herein illustrated, is adapted to be reciprocated longitudinally of the machine on the rails 13 as the machine travels forwardly, such reciprocatory movement being imparted to the blade by a pair of hydraulic pistons 90 and 93.

Specifically, with the strike-off at its rearward limited position and about to move forwardly, the forward thrust produced by the piston rods 90 and 93 will initially rock the blade-supporting frame in a counter-clockwise direction, as viewed in FIGURE 2, until the strike-off is substantially vertical.

Thereafter, the continued thrust of the piston rods moves the strike-off bodily upon rollers 17 which move forwardly on rails 13, the strike-off remaining in the position shown in FIGURE 2. The inclined blade 45 of the strike-off functions to scoop the road material in front of it and spreads and preliminarily levels and shapes it.

Referring particularly to FIGURES 5 and 8, rollers 115 and 116 are carried by plate 20 and are disposed beneath rail 13. Of course, the same arrangement obtains on both sides of the machine. Accordingly, when the strike-off moves forwardly, as described, any tendency for the road material which accumulates in front of the strike-off blade to raise the strike-off off of its rollers 17 is prevented by the engagement of the rollers 115 and 116 with the lower sides of the rails 13.

When the strike-off reaches its forward extreme travel, the front rollers 17 engage in notches 117 in the forward portion of rails 13. At this positon of the strike-off the piston rods 90 and 93 reverse their motion. The initial movement of the piston rods, due to the inertia of the strike-off and also due to the fact that the forward rollers 17 are engaged in notches 117, results in rocking movement of the strike-off about stub shafts 28. Thus, the strike-off 12 is rocked in a clockwise direction, as viewed in FIGURE 3, in which position the inclined blade 45 is raised substantially out of contact with the previously spread road material. Thereafter, further retractive movement of the piston rods 90 and 93 carries the strike-off rearwardly in its canted or rocked position. The operation may then be repeated at the will of the operator.

Behind the strike-off 12 a frame extends transversely across the machine. The frame comprises an inverted channel iron 118 (FIGURE 11) to the forward flange of which there is secured a plate 119 which extends downwardly from the channel iron. A channel iron 120 is secured to the lower edge portion of plate 119 and a second plate 121 is also secured to the lower edge portion of plate 119, the web of channel iron 120 and plate 121 being spaced from each other to provide a slot 122, the purpose of which will be hereinafter more fully described.

Three brackets 123, 124 and 125 (FIGURE 1) are secured to the face of plate 119 and extend laterally therefrom, the brackets being spaced from each other along the length of the plate. Bracket 123, at its end, carries a collar 126 which, in turn, carries a downwardly extending rod 127. Bracket 124 also carries a collar 128, which, in turn, carries a downwardly extending rod 129. The rods 127 and 129 are in transverse alignment with each other. Bracket 125 also carries a collar 130 which, in turn, supports a third downwardly extending rod 131. The rod 131, however, is transversely offset with respect to rods 127 and 129.

A channel iron 132 (FIGURE 12) is secured to an intermediate portion of rod 127 by welding 133, the channel iron being positioned upon the rod beneath bracket 123. A rubber block 134 confined between plates 134′ and 134″ is positioned upon the channel iron 132 and an angle bracket 135 has one leg thereof positioned upon the upper portion of the plate 134′. Plate 134′ carries a bolt 135′ which extends through the angle bracket 135 and block 134 is secured to the angle bracket by nut 136′. In similar fashion, plate 134″ carries a bolt 135″ which passes through the web of channel 132 and is secured by nut 136″. A leaf spring 137 is carried upon flange 138 of the angle bracket 135 and at its end said spring carries a clamp 139 which is secured to the spring by bolts 140. The clamp 139 comprises jaws 141 which embrace a transverse rod 142 of substantially circular section, the clamp being secured to the rod by means of bolts 143.

A channel iron 144 is secured to an intermediate portion of rod 129 beneath bracket 124. A rubber block 145 having top and bottom plates 145′ and 145″, respectively, is positioned upon channel 144 on one side of the rod 129 and an angle bracket 146 has one leg 147 positioned on top of the plate 145′. The plate 145′ carries bolt 146′ which extends through the angle bracket 146 and is secured thereto by nut 146″. Plate 145′ carries a bolt 147′ which extends through the web of channel 144 and is secured thereto by nut 147″. A leaf spring 149 is secured to a flange 150 of the angle bracket 146 and said leaf spring carries a clamp 151 which embraces rod 142 and clamps said rod by means of bolts 152. A second rubber block 153 having top and bottom plates 153′ and 153″ is positioned upon the channel iron 144 on the opposite side of the rod 129 and an angle bracket 154 has one leg 155 thereof positioned upon the top of the plate 153′. The plate 153′ carries a bolt 155′ which extends through leg 158 and is secured thereto by nut 156. The bottom plate is secured to channel 144 in similar fashion. A leaf spring 157 is secured at one end to flange 158 of the angle bracket 154 and said leaf spring carries a clamp 159 which makes clamping engagement with rod 160. It will be noted that rod 160 is offset with regard to rod 142.

A similar channel iron 161 is carried by rod 131, a rubber block and angle bracket similar to the block 134 and angle bracket 135 hereinbefore described is carried by the angle iron 161. A leaf spring 162 is carried by the angle bracket associated with the channel iron 161 and carries at its end a clamp which also engages rod 160.

It will be noted that rod 142 is supported by brackets 123 and 124 and that rod 160 is supported by brackets 125 and 124, the bracket 124 affording a common support for the end portions of both rods 142 and 160.

Rod 142 is provided with an elongated slot 163 in which the upper edge portion of screed 164 is secured, the screed comprising an L-shaped structure having a vertical leg 165 and a substantially horizontal leg 166. The screed 164 is substantially coextensive in length with rod 142. In similar fashion rod 160 is provided with an elongated slot 167 for the reception of the upper edge portion of screed 168 which comprises a substantially vertical leg 169 and a substantially horizontal leg 170, screed 168 being substantially coextensive in length with rod 160.

Rod 142 carries a vibrating mechanism 171 and rod 160 carries a similar vibrating mechanism 172. The vibrating mechanisms 171 and 172 are of conventional construction and comprise motors 173 and 174, respectively, which drive eccentrically mounted rotatable weights (not shown). When the respective motors are energized, vibration is imparted to rods 142 and 160 and, hence, screeds 164 and 168 are respectively vibrated.

The arrangement is such that, as the machine moves forwardly, the struck-off or preliminarily spread road material passes beneath the vibrating screeds 164 and 165 and said material is compacted and further leveled, the vibration tending to submerge the larger particles of aggregate of the road material and bring some of the fines and some of the water to the surface of the pavement.

To brace the vertical legs 165 and 169 of the screeds 164 and 168 respectively as the screeds move forwardly, rubber snubbers 175 are carried by the rods 127, 129 and 131 and by an auxiliary rod 176 carried by channel iron 144. Thus, by means of the leaf springs 137, 149, 157 and 162, the rubber blocks 134, 145, 153 and the block associated with rod 131, and the snubbers 175, the screeds have a degree of freedom to vibrate but said vibration is not transmitted to the machine proper.

Immediately following the vibrating screeds 164 and 168 a tamper and smoothing assembly is carried by the machine, the tamper and smoothing assembly being designated generally by the reference numeral 177. A plurality of angles 178 are mounted in spaced relationship upon the inverted channel iron 118 which extends transversely across the machine. A bearing 179 is mounted upon each angle 178 through which a pin 180 extends. A rockable arm 181, each comprising a pair of spaced bars 182 (FIGURE 1), is journaled intermediate its length upon each pin 180.

A shaft 183, journaled in spaced bearings 184 mounted upon the machine frame, is driven by sprocket 185 which in turn, is driven by sprocket 186 mounted upon the shaft of motor 187, a roller chain 188 being trained around sprockets 185 and 186. A plurality of eccentrics 189 are mounted in spaced relationship to each other upon shaft 183 and a connecting rod 190 carrying a bearing 191 embraces each eccentric, each connecting rod being pivotally connected at its opposite end to a respective arm 181. The arrangement is such that when motor 187 is driven the arms 181 are rocked about pivot pins 180.

A tamper connecting rod 192 comprising a restricted end portion 193 and an enlarged weighted portion 194 is connected by means of bearing 195 to each arm 181, and adjacent pairs of said tamper connecting rods 192 are secured, as by welding 196, to a tamper bar 197. The function of the tamper bars 197 is to knead the road material after it has passed beneath the vibrating screeds 164 and 168.

As will be hereinafter more fully described, the movement of the tamper bars 197 is not vertical, but before describing the specific movement thereof and the mechanism for producing said movement, the smoothing member following the tamper bars will be first described.

A smoothing member 198, also called an extrusion meter, is positioned immediately behind the tamping bars 197 and comprises essentially a substantially horizontal plate 199 and a forward substantially vertical upwardly extending flange 200, the plate 199 and flange 200 being preferably integral and being connected by a rounded bend 201. The smoothing member or extrusion meter extends substantially entirely across the machine, specifically from substantially the beam surface 6 on one side of the machine to substantially the corresponding beam surface 6 on the opposite side of the machine. The function of the smoothing member, particularly the plate 199, is to smooth and substantially "iron" or "mold" the upper surface of the road as the machine passes forwardly, i.e., to extrude the concrete through the space defined by the slip-form surfaces 6, the road site and the lower surface of the plate 199.

T-irons 202 are secured to the upper face of the plate 199 and are substantially coextensive with the length of the plate. The smoothing member is supported from a plate 203 which bridges the flanges of the channel iron 120 and a similar plate 204 which bridges the flanges of a channel iron 205. Channel iron 205, similar to channel iron 120, extends across the machine, and is disposed rearwardly of channel iron 120. Spaced along the length of each of the plates 203 and 204 are a plurality of substantially triangular segments 206, similar to segments 61, hereinbefore described, which are pivotally mounted at their corners to the respective plates 203 and 204. One corner of each of the segments is pivotally connected to a pair of rocking rods 207, similar to the rods 64, hereinbefore described, which when moved longitudinally, rock the segments about their pivotal connections to plates 203 and 204.

The remaining corner of each of the segments 206 is pivotally connected to a clevis 208 which, in turn, is threadedly connected to a turnbuckle screw 209. The opposite end of the turnbuckle screw is threadedly connected to a clevis 210 which pivotally connects with a leg of the T-iron 202. The threads at the opposite end portions of the turnbuckle screw are oppositely pitched whereby when an intermediate rectangular sectioned nut 211 is turned, the screw is effectively shortened or lengthened. Inasmuch as a plurality of supporting links, as hereinbefore described, are employed, spaced portions of the smoothing member may be raised or lowered.

To guide the smoothing member in its vertical movement, the upper edge portion 212 of the flange is slidably positioned in the space 122. Thus, the smoothing member may be moved upwardly and downwardly, at will, and yet the front portion of said member will be effectively sealed against rearward passage of road material over plate 199.

By provision of a plurality of turnbuckle and segment arrangements, comprising the elements 206, 207, 208, 209, 210 and 211, it can be readily be appreciated that the plate 199, throughout its length, that is, transversely across the road, may be locally warped to impart to the upper surface of the road a desired transverse contour. For instance, the turnbuckles adjacent the central portion of the blade may be relatively shortened so as to impart a crown to the road, or the turnbuckles may be appropriately manipulated to impart any desired transverse contour.

In both the case of the strike-off member or spreader 12 and the smoothing member 198 the segments 61 (FIGURES 9 and 10) and the segments 206 may be so constructed as to normally crown the road. For instance the distance between the pivot point 62 and pin 59 (FIGURE 10) for the centermost segment 61 may be greater than the corresponding distance for the segments closer to the edges so that for a given pull of rod 64, the spreader will be warped at the center a greater degree than adjacent the outer ends. The same expedient may also be used in conjunction with the smoothing member 198 for the same purpose.

By the provision of the longitudinally movable bars 207 and the segments 206, the forward and rearward edge portions of the horizontal plate 199 in its pre-set warped condition may be individually bodily raised and lowered, as desired to effect the above described concrete extruding or molding function.

Having described the smoothing member and its operation and function the specific movement of the tamper bars 197 and the reason for said unique movement will be better understood.

A clamp 213, comprising a block 214 provided with an aperture 215, embraces each tamper 192, the block 214 being provided with a slot 216 which extends from the exterior of said block to said aperture. A bolt 217 functions to close the split block upon the tamper. A collar 218 is secured, as by welding 219, to an end portion of the block 214 opposite bolt 217. A bolt 220 extends through collar 218 and functions to pivotally connect opposite arms 221 to clamp 213. A collar 222 is mounted upon plate 119, being secured thereto by welding 223, and a bolt 224 extends through said collar and pivotally connects the opposite ends of arms 221 to said collar.

Thus when arms 181 are rocked by motor 187, as has been hereinbefore described, the arcuate movement of the upper ends of the tamper rods 192 being compounded by the arcuate movement of the intermediate portions of the tamper rods imparted thereto by the swingable arms 221 which straddle the tamper rods, impart an arcuate movement to the tamper bars 197. Thus, the tamper bars 197 move in an arc downwardly and inwardly and upwardly and outwardly relative to the smoothing member 198. This motion of the tamper bars tends to knead or squeeze the road material toward and under the plate 199, that is, the road material is forced around and under the rounded edge 201 of the smoothing member. This movement of the road material establishes a pressure immediately beneath horizontal plate 199 acting upwardly against the lower surface of the plate, and causes said forwardly moving plate to extrude the concrete to desired form, that is, to exert the "ironing" or "molding" action upon the upper surface of the concrete, as hereinbefore indicated.

To briefly review the operation of the machine comprising the present invention, the machine carries its own forms, referred to as slip forms, and the operations contemplated and described are all carried out between said forms as the machine moves along the subgraded road. The road material is first deposited upon the subgraded road, the deposited material being in roughly distributed piles. As the machine travels forwardly the strike-off mechanism moves forwardly and rearwardly, the forward movement spreading the road material between the forms and striking off an approximate level. The strike-off mechanism can be moved in timed relationship with the movement of the machine or intermittently, either being under the control of the operator. The road material thus struck off and spread to an approximate level is acted upon by a vibrating screed which tends to bring the level to a closer approximation to its finished level, the screed compacting and densifying the road material and bringing the fines toward the surface. As the machine moves forwardly, the road material moves relatively beneath the tamper bars which further compact the materials and urge it under pressure beneath and into pressure contact with the lower face of the smoothing plate. The surface of the road material is thereby "ironed" or molded into intimate conformance with the smooth undersurface of the plate, and the material is forced laterally outward against the slip-forms, whereby the plate acts to extrude the material, i.e., the concrete, through a space or opening of predetermined size and side and top configuration, thereby to mold the concrete to its desired finished dimensions.

If desired, other instrumentalities may be carried by the machine following the smoothing member, such as, for instance, a transversely moving smoothing device (not shown) or other conventional after-working devices. Broadly, however, the invention is directed to the combination of elements set forth in the appended claims.

We claim as our invention:

1. A slip form concrete paving machine for movement over a subgraded road site for laying thereon in a single pass of the machine a finished concrete roadway, said machine comprising, in combination, a rigid frame structure of substantial mass including spaced parallel coextensive rigid slip forms of substantial length at the sides thereof, a strike-off between said slip forms adjacent the forward ends thereof and extending from one form to the other, means mounting said strike-off on said frame structure for independent vertical adjustment, vibrating means mounted on said frame structure between said slip forms rearwardly of said strike-off and operatively extending from one form to the other, a pressure plate between said slip forms rearwardly of said vibrating means and extending from one form to the other, said plate including a generally horizontal plate portion of substantial dimension longitudinally of the machine and an upright portion extending upwardly from the forward edge of said horizontal portion, and means mounting said plate on said frame structure for transferring the mass of the machine to said plate, the mounting means for said plate including means for effecting independent vertical adjustment of each of the forward and rearward edges of said generally horizontal portion of said plate.

2. The machine as set forth in claim 1, including tamper means between said slip forms intermediate said vibrating means and said plate and extending from one form to the other, and means mounting said tamper means on said frame structure for intermittent movement angularly downwardly and rearwardly immediately in advance of the forward edge of the horizontal portion of said plate.

References Cited by the Examiner

UNITED STATES PATENTS

| | | | |
|---|---|---|---|
| 544,235 | 8/1895 | McKelvey | 94—46 |
| 1,306,353 | 6/1919 | Reynolds | 94—45 |
| 1,584,385 | 5/1926 | Lichtenberg | 94—45 |
| 1,982,387 | 11/1934 | Heltzel | 94—45 |
| 2,084,068 | 6/1937 | Vinton | 94—45 |
| 2,090,959 | 8/1937 | Jackson | 94—48 X |
| 2,094,910 | 10/1937 | Baily | 94—48 |
| 2,235,105 | 3/1941 | Heltzel | 94—45 |
| 2,245,426 | 6/1941 | Baker | 94—46 |
| 2,269,109 | 1/1942 | Jackson | 94—46 |
| 2,346,379 | 4/1944 | Jackson | 94—46 X |
| 2,351,592 | 6/1944 | Barber | 94—46 |
| 2,380,435 | 7/1945 | Heltzel | 94—46 |
| 2,779,258 | 1/1957 | Johnson | 94—46 |
| 2,864,290 | 12/1958 | Freeman | 94—46 |
| 2,976,784 | 3/1961 | Perkins | 94—45 |
| 3,087,394 | 4/1963 | Barnes | 94—48 |

FOREIGN PATENTS 636,712  10/1936  Germany.

OTHER REFERENCES

Construction Methods and Equipment, September 1953, pages 128, 129, and 132.

Construction Methods and Equipment, January 1954, pages 116, 118, and 121.

Construction Methods and Equipment, November 1954, pages 90 and 91.

Engineering News Record, May 11, 1950, page 25.

JACOB L. NACKENOFF, *Primary Examiner.*

WILLIAM I. MUSHAKE, *Examiner.*

C. VAN VECHTEN, *Assistant Examiner.*